Figure 1:
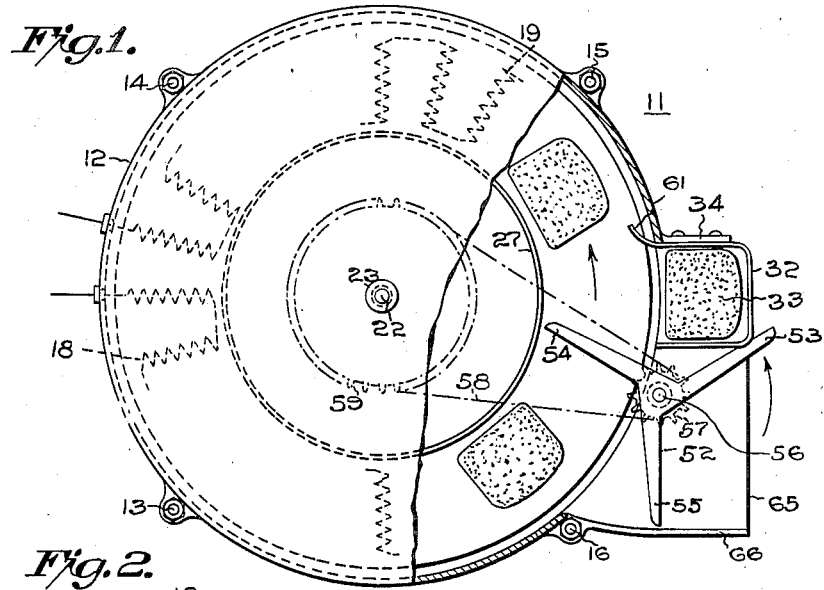

June 30, 1925.  1,543,737

F. THORNTON, JR

AUTOMATIC ELECTRIC TOASTER

Filed March 13, 1924  2 Sheets-Sheet 1

WITNESSES:
R. S. Harrison
N M Biebel

INVENTOR
Frank Thornton, Jr.
BY
Wesley G. Carr
ATTORNEY

June 30, 1925.

F. THORNTON, JR 1,543,737

AUTOMATIC ELECTRIC TOASTER

Filed March 13, 1924

2 Sheets-Sheet 2

WITNESSES:
R. S. Harrison
N. M. Biebel

INVENTOR
Frank Thornton, Jr.
BY
Wesley G. Carr
ATTORNEY

Patented June 30, 1925.

1,543,737

UNITED STATES PATENT OFFICE.

FRANK THORNTON, JR., OF PITTSBURGH, PENNSYLVANIA, ASSIGNOR TO WESTINGHOUSE ELECTRIC & MANUFACTURING COMPANY, A CORPORATION OF PENNSYLVANIA.

AUTOMATIC ELECTRIC TOASTER.

Application filed March 13, 1924. Serial No. 698,876.

*To all whom it may concern:*

Be it known that I, FRANK THORNTON, Jr., a citizen of the United States, and a resident of Pittsburgh, in the county of Allegheny and State of Pennsylvania, have invented a new and useful Improvement in Automatic Electric Toasters, of which the following is a specification.

My invention relates to toasters and particularly to automatic electric toasters.

One object of my invention is to provide a relatively simple and compact mechanism for toasting a plurality of successive slices of bread.

Another object of my invention is to provide a bread-toasting mechanism with means for moving successive slices of bread on a carrier and for removing them therefrom when toasted.

Another object of my invention is to provide means for supporting a plurality of slices of bread in superposed position to have the top slices moved onto a carrier and for maintaining the successive top slices at substantially the level of the carrier.

In practicing my invention, I provide a casing having a plurality of spaced electric heating elements therein and a substantially horizontal, annular table rotating between said heating elements. The table is mounted on a vertical shaft driven by a suitable motor.

A vertically-extending auxiliary casing disposed adjacent to the main casing receives a plurality of superposed slices of bread, the topmost slice being substantially level with the table. Means actuated by the shaft push the successive top slices of bread onto the table and removes bread therefrom after less than a complete revolution thereon. Means, also actuated by the shaft, moves up the support of the stack of slices of bread so that the bottom of the topmost slice of the stack is substantially level with the table to permit of its being transferred to the same.

Figure 2:
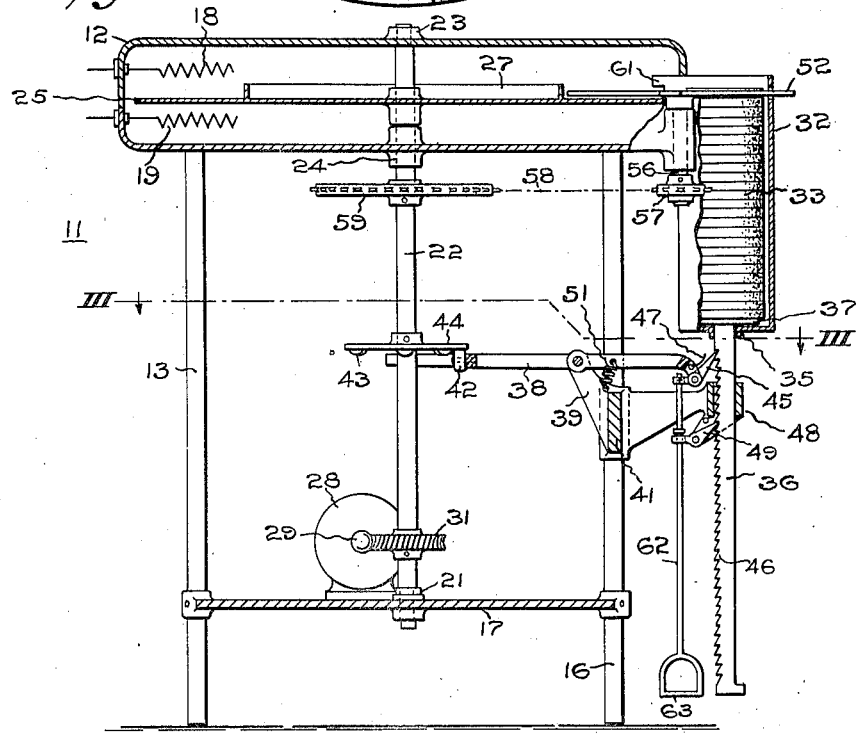
Figure 3:
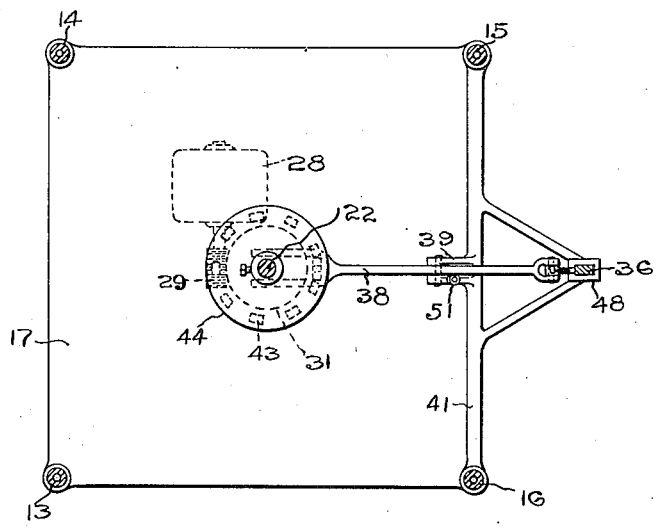
Figure 4:
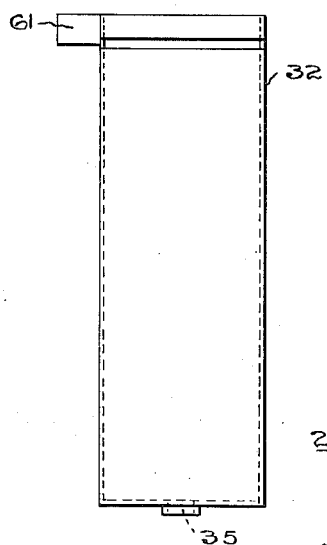
Figure 5:
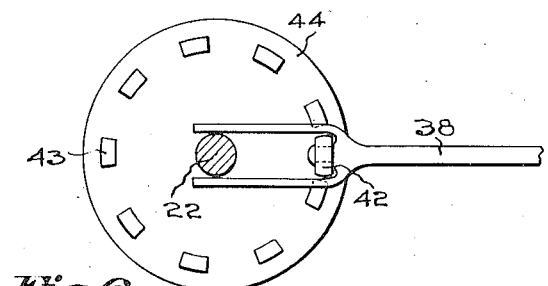
Figure 6:
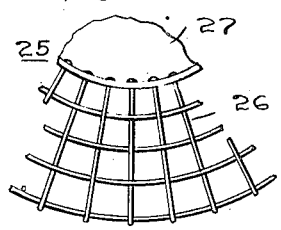

In the drawings,

Figure 1 is a top plan view, with a portion cut away, of a device embodying my invention, Fig. 2 is a view thereof, partially in side elevation and partially in vertical section, of a device embodying my invention, Fig. 3 is a horizontal sectional view therethrough, taken on the line III—III of
Fig. 2, Fig. 4 is a view, in side elevation, of a bread casing comprising a part of the device embodying my invention, Fig. 5 is a fragmentary bottom plan view illustrating an actuating means comprising a part of the device embodying my invention, and Fig. 6 is a fragmentary top plan view of a material carrier.

A toaster, designated generally by the numeral 11, comprises a relatively shallow metal casing 12 that is supported by a plurality of vertically extending members 13, 14, 15 and 16, the upper ends of which are located in and extend through suitable integral lugs provided on the outside of the casing 12.

A supporting and stiffening plate 17 is provided intermediate the ends of the supporting members 13 to 16, inclusive, and may comprise a suitable metal plate through which the supporting members extend. The member 17 serves as a means for stiffening the entire structure.

Within the casing 12 there are provided a pair of superposed sets of electric heating elements 18 and 19, which are distributed substantially uniformly over the greater portion of the periphery within the casing
12. As the particular construction of these heating elements forms no part of my invention, I have illustrated them schematically only and any suitable or desired construction may be employed so long as it is effective to heat the interior volume of the casing 12 and gives off the greater part of the heat thereof in the form of radiant energy to toast slices of bread that are moved therebetween in a substantially annular path by means to be hereinafter described.

The supporting member 17 is provided with a suitable thrust bearing 21 within which there is supported the lower end of a vertically extending shaft 22, the upper end of which is rotatably mounted in a bearing member 23 mounted in the top portion of the casing 12. An intermediate bearing member 24 is provided in the lower part of the casing member 12, it being understood that these bearing members are suitably alined to receive the shaft 22 and to permit it to rotate freely therein. Any suitable or desired type of bearing members may be employed and if desired, the intermediate bearing 24 may constitute the thrust bearing.

A material-carrying means 25, comprising a table, is mounted on the shaft 22 within the casing 12 and is so located thereon that the slice of bread resting on its upper surface, is substantially equidistant from the two heating elements 18 and 19.

Fig. 6 of the drawings illustrates a suggested form for the outer peripheral portion of the table 25 and I have there shown it as comprising an open wire network or foraminous member 26 made up of interwoven wire members, the radial wires of which are suitably riveted to the substantially solid intermediate part 27. The reason for using an open or foraminous peripheral portion is to permit the heat from the radiant heating elements to strike directly the slices of bread and toast them quickly.

Means for causing a rotation of the shaft 22 comprises a motor 28 that is mounted on the plate 17 and that may be made adjustable in speed by any means known in the art. A worm 29 is mounted on the outer end of the motor shaft and operatively engages a worm wheel 31 that is mounted on the shaft 22, whereby the relatively high speed of the motor is reduced to a relatively low speed for the shaft and the material-carrying means 25.

An auxiliary casing 32 is located closely adjacent to the outer peripheral portion of the casing 12 at one point thereof and is of such size in lateral dimensions as to freely receive an ordinary slice of bread. Its depth may be any desired amount so that it will receive and support the superposed slices of bread indicated at 33, in Fig. 2 of the drawings.

The casing 32 is secured to an integral and radially extending portion 34 of the casing 12, as is illustrated more particularly in Fig. 1 of the drawings.

The bottom of the casing 32 is provided with a suitable opening 35 therethrough and a ratchet bar 36 extends therethrough and has secured thereto at the upper end thereof a supporting plate 37 upon which the superposed slices of bread may rest.

Means for raising the stack of superposed slices of bread, in accordance with the turning movement of the material-carrier 25, comprises a lever 38 that is pivotally mounted intermediate its ends on a suitable support 39 which is, in turn, supported by a cross member 41, suitably secured to the supporting means 15 and 16 intermediate their ends. The inner end of the lever 38 is forked, as is illustrated more particularly in Fig. 3 of the drawing, and is provided at the inner end of the fork with a hardened steel bumping block 42 that is operatively engaged by a plurality of spaced integral lugs 43 mounted on the under surface of a plate 44 that is suitably mounted on and secured to the shaft 22.

As the successive lugs 43 strike the bumping block 42, the inner end of the lever is depressed and the outer end thereof is raised. A pawl 45 that is resiliently held in operative engagement with the ratchet teeth 46 of the bar 36 by means of a spring 47, is pivotally mounted on the outer end of the lever 38.

The bar 36 is vertically movable in a bearing member 48 that extend outwardly from and may be an integral part of the cross bar 41 hereinbefore described. The bearing member 48 carries also a pivotally-mounted second pawl 49. The lever 38 is yieldingly held with its outer end in a depressed position by a spring member 51 having one end connected to the lever 38 and the other to the member 39.

Means for moving successive slices of bread from the top of the stack of slices 33, comprises a star wheel 52 having a plurality of substantially radially extending arms 53, 54 and 55, that is suitably secured to the top of a vertical shaft 56 mounted in a suitable bearing member that may comprise an integral portion of the lower part of the casing 12, as is more particularly illustrated in the right-hand side of Fig. 2 of the drawings.

A sprocket wheel 57 is mounted on the lower end of the shaft 56 and is driven by a chain 58 indicated schematically only that is driven by a sprocket wheel 59 mounted on the shaft 22.

The location of the shaft 56 relatively to the auxiliary casing 32 is such that when the star wheel 52 is caused to rotate in a counter-clockwise direction, as viewed from the top thereof, the topmost slice of bread is moved from the stack to the material carrier 35, which also turns in a counterclockwise direction, as viewed from the top thereof.

The upper portion of the casing 32 is provided with an extended flanged portion 61 that is bent to arcuate form, as is illustrated more particularly in Fig. 1 of the drawing, in order that it may assist in transferring the slice of bread from the stack to the material carrier when moved by one of the radial arms of the star wheel 52.

Means for permitting the return of the ratchet bar 36 to its lowermost position comprises a depending lever 62 that is operatively connected to the two pawls 45 and 49 respectively, extending loosely therethrough. A stirrup or handle 63 at the lower end of the member 62 permits of pulling it downwardly, whereby both pawls are released from their operative engagement with the teeth 46, whereby the bearing 36 is permitted to return to its lowermost position under the action of gravity.

The operation of the device embodying my invention is substantially as follows:

The extended heating elements 18 and 19 are energized a proper length of time to bring them and the immediately adjacent parts of the device to a substantially constant temperature. In order to reduce this time, I prefer to make all of this part of the device as light and as small as possible in order to reduce the heat storage capacity thereof. A stack of superposed slices of bread is then placed in the container 32, the ratchet bar being in substantially the position illustrated in Fig. 2 of the drawing.

The motor is then energized, whereby the sprocket wheel 59 will cause a turning movement of the shaft 56, as hereinbefore described and a turning movement of the substantially radial arms of the star wheel 52, the first one of which moves the topmost slice of bread onto the outer portion 26 of the material carrier 25. Simultaneously one of the depending lugs 43 on the plate 44 causes a tilting movement of the lever 38, whereby the outer end thereof is raised and simultaneously the ratchet bar 36 is raised by action of the pawl 45 secured to the outer end of the lever 38.

The lower pawl 49 serves to hold the rigid bearing in this elevated position, after it has been raised through a distance substantially equal to the thickness of a slice of bread. This places the topmost slice of bread in position to be engaged by the next radial arm 55 and to be pushed onto the material carrier. The speed of the turning movement of the material carrier and the amount of heat generated by the heating elements are so selected that the successive slices of bread will be toasted to the proper degree, after substantially one revolution, or slightly less, through the casing 12 between the heating elements.

If we indicate by the numeral 64 in Fig. 1 of the drawings, the first slice of bread moved onto the material carrier and it has made substantially one revolution between the heating elements, it is in position to be engaged by one of the radial arms of the star wheel 52, and to be moved radially outwardly and away from the material carrier on to a supporting plate 65 that may be an integral part of the casing 12.

A vertically extending lid or flange 66 is provided on the part 65 to insure that the toasted slices of bread will move substantially radially outwardly onto the support 65.

It is understood, of course, that the number of teeth in the sprocket wheels 57 and 59, respectively, are such that the proper speed of the star wheel 52 is obtained to actuate successive slices of bread in a substantially continuous stream on to the material carrier and to remove the toasted slice of bread therefrom after substantially one revolution thereon between the heating elements.

The number of depending lugs 43, causing the actuation of the step-by-step lifting means for the ratchet bar 36 and the support 37 are also so selected that it will cooperate with the star wheel 52 to always have a slice of bread at a height substantially equal to, or slightly greater than, the top of the material-carrier or table 25, so that one of the arms of the star wheel 52 may move it onto the carrier.

When the rigid bar has been moved to its uppermost position and all of the slices of bread have been removed therefrom, it is only necessary for the operator to pull downwardly on the member 62, whereby both pawls are moved out of operative engagement with the rigid bearing 36 permitting it to return to its originally low position ready for a second stack of slices of bread to be placed thereon and thereby to permit of continuously toasting slices of bread.

The device embodying my invention thus provides a motor-operated material supporting and moving means for moving successive slices of bread between two extended spaced heating elements and provides further a means of the step-by-step type for placing slices of bread on a material carrying means or table and for removing them therefrom when toasted.

Various modifications and changes may be made, without departing from the spirit and scope of the invention, I desire, therefore, that only such limitations shall be placed thereon as are imposed by the prior art or are set forth in the appended claims.

I claim as my invention:

1. In an electric toaster, in combination, a material-supporting and moving means and a single means for pushing material on, and for removing it from, said supporting and moving means.

2. In an electric toaster, in combination, a horizontally rotatable table, a plurality of extended heating elements located respectively above and below said table, and a single means operatively connected to said table for moving material on, and for removing it from said table.

3. In an electric toaster, in combination, a horizontally rotatable table, a plurality of extended heating elements located respectively above and below said table, means for supporting a plurality of slices of bread to be toasted adjacent to said table, and a single means for pushing slices of bread on said table and for removing slices of toasted bread therefrom.

4. In an electric toaster, in combination, a horizontally rotatable table, a plurality of extended heating elements located respectively above and below said table, means for supporting a plurality of superposed slices of bread adjacent to said table, and a single means for pushing the uppermost slice of bread onto said table and for removing a toasted slice of bread therefrom.

5. In an electric toaster, in combination, a horizontally rotatable table, a plurality of extended heating elements located respectively above and below said table and a constantly operated means actuated by said rotatable table for pushing successive slices of bread onto said table and for removing them therefrom after one rotation thereof.

6. In an electric toaster, in combination, a horizontally rotatable table, a plurality of extended heating elements located respectively above and below said table, means for supporting a plurality of slices of bread in superposed position adjacent to said table, means for pushing the uppermost slice of bread on said table, and means for maintaining the successive top slices of bread substantially level with said table.

7. In an electric toaster, in combination, a plurality of spaced heating elements, means for carrying slices of bread therebetween to be toasted, means for supporting a plurality of superposed slices of bread adjacent to said carrying means and for maintaining the top slice substantially level with said carrying means, and means for moving the top slice of bread onto said carrying means and for removing it therefrom after being toasted.

8. In an electric toaster, in combination, a plurality of spaced heating elements, an annular, substantially horizontal table moving between said heating elements, means for supporting a plurality of superposed slices of bread adjacent to said table, means for maintaining the top slice of bread substantially level with said table, and means for moving the top slice of bread onto said table, both said maintaining and said moving means being actuated by said moving table and directly in accordance with the speed thereof.

9. In an electric toaster, in combination, a casing, a substantially horizontal annular table rotating within said casing, a plurality of heating elements located respectively above and below said table, means for pushing slices of bread onto said table at one point relatively to said casing, said pushing means being effective to remove toasted slices of bread from said table after less than one revolution thereon.

10. In an electric toaster, in combination, a casing, a substantially horizontal annular table rotating within said casing, a plurality of heating elements located respectively above and below said table, means for pushing slices of bread onto said table at one point relatively to said casing, said pushing means being effective to remove toasted slices of bread from said table after less than one revolution thereon, said pushing means being actuated by, and in direct accordance with the speed of said rotating table.

11. In an electric toaster, in combination, a horizontally rotatable table, a plurality of extended heating elements located respectively above and below said table, and a single means for effecting the delivery of a substantially continuous succession of slices of bread onto said table and for removing them therefrom after less than one revolution thereon.

12. In an electric toaster, in combustion, a horizontally rotatable table, a plurality of extended heating elements located respectively above and below said table, and a single means for effecting the delivery of a substantially continuous succession of slices of bread onto said table and for removing them therefrom after less than one revolution thereon, said delivery means being actuated by and in direct accordance with the speed of said table.

13. In an electric toaster, the combination with a casing, a plurality of spaced heating elements located in said casing, a substantially horizontally-extending annular table rotating in said casing between said heating elements, a vertical shaft operatively supporting said table, and an electric motor for driving said shaft and table, of a single means for effecting the delivery of a substantially continuous succession of slices of bread onto said table and for removing them therefrom after less than one revolution thereon.

14. In an electric toaster, the combination with a casing, a plurality of spaced heating elements located in said casing, a substantially horizontally-extending annular table rotating in said casing between said heating elements, a vertical shaft operatively supporting said table, and an electric motor for driving said shaft and table, of a single means for effecting the delivery of a substantially continuous succession of slices of bread onto said table and for removing them therefrom after less than one revolution thereon, said delivery means being actuated by and in direct accordance with the speed of said rotating table.

15. In an electric toaster, the combination with a casing, a plurality of spaced heating elements located in said casing, a substantially horizontally-extending annular table rotating in said casing between said heating elements, a vertical shaft operatively supporting said table, and an electric motor for driving said shaft and table, of means for supporting a plurality of slices of bread in superposed position adjacent to said table, means for pushing the uppermost slice of bread on said table, and means for maintaining the successive top slices of bread substantially level with said table.

16. In an electric toaster, the combination with a casing, a plurality of spaced heating elements located in said casing, a substantially horizontally-extending annular table rotating in said casing between said heating elements, a vertical shaft operatively supporting said table, and an electric motor for driving said shaft and table, of means for supporting a plurality of slices of bread in superposed position adjacent to said table, a star wheel for pushing the successive uppermost slice of bread onto said table, and pawl and ratchet means, actuated by said shaft, for maintaining the successive top slices of bread substantially level with said table.

In testimony whereof, I have hereunto subscribed my name this 5th day of March 1924.

FRANK THORNTON, Jr.